C. B. SMITH.
NUMBERING MACHINE.
APPLICATION FILED SEPT. 2, 1908.
961,035.
Patented June 7, 1910.
2 SHEETS—SHEET 1.
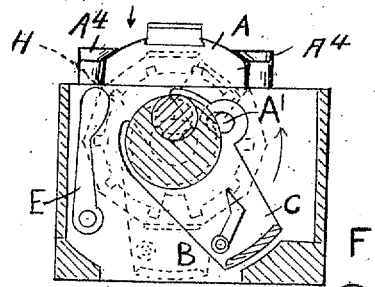
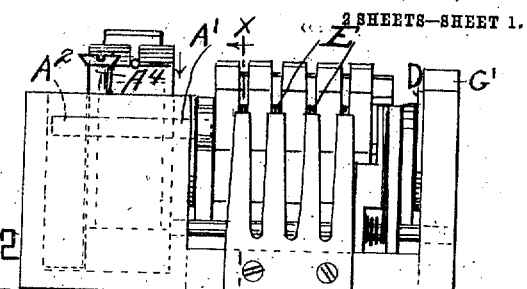
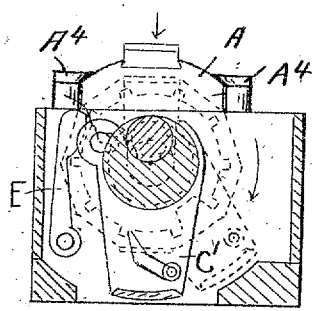
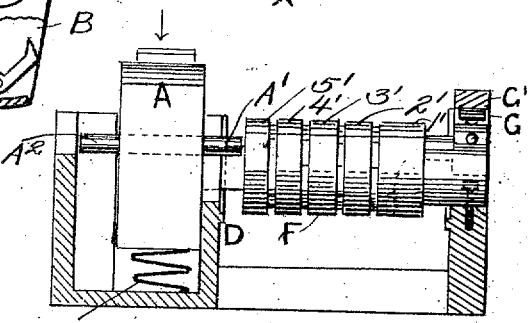
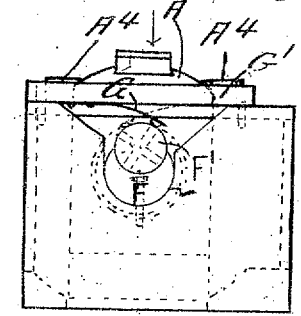
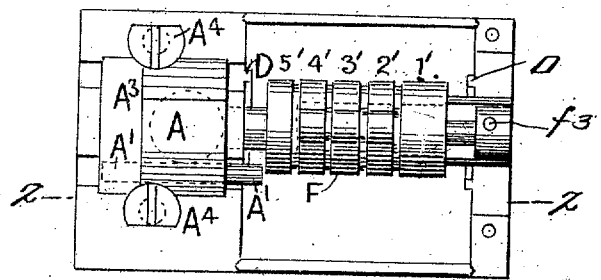
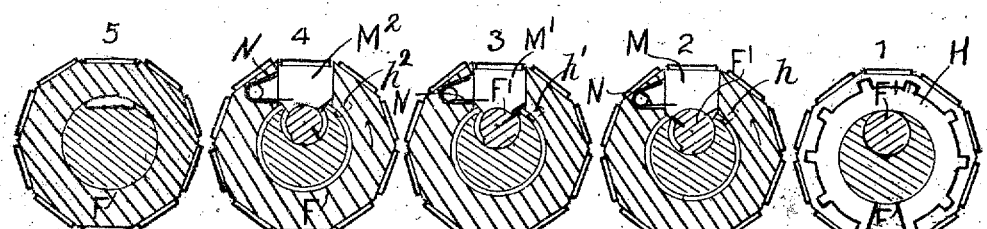
Witnesses:
Inventor
Charles B. Smith
By James L. Norris C. B. SMITH.
NUMBERING MACHINE.
APPLICATION FILED SEPT. 2, 1908.
961,035.
Patented June 7, 1910.
2 SHEETS—SHEET 2.
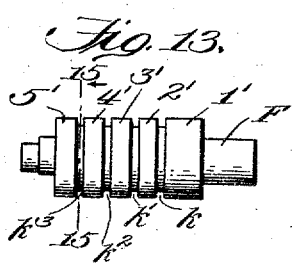
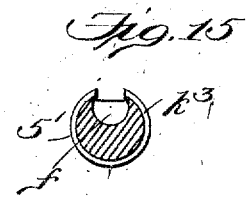
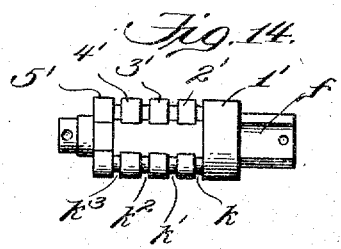
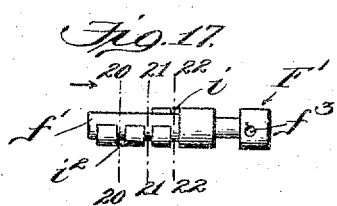
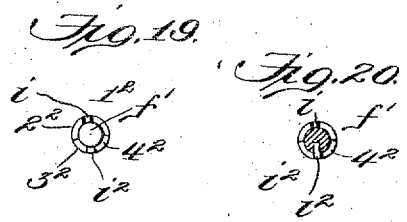
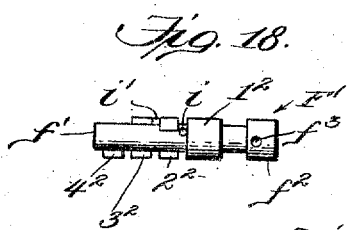
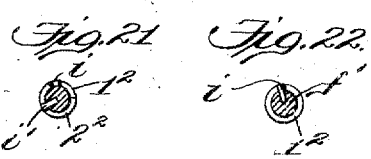
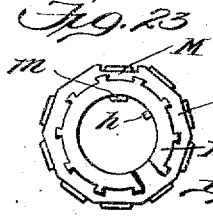
Witnesses.
Inventor
Charles B. Smith
By James L. Norris
Atty.

UNITED STATES PATENT OFFICE.

CHARLES BOWTELL SMITH, OF DUNEDIN, NEW ZEALAND.

NUMBERING-MACHINE.

961,035.　　　Specification of Letters Patent.　Patented June 7, 1910.

Application filed September 2, 1908. Serial No. 451,380.

*To all whom it may concern:*

Be it known that I, CHARLES BOWTELL SMITH, subject of His Majesty the King of Great Britain, residing at the city of Dunedin, in the British Dominion of New Zealand, have invented certain new and useful Improvements in Numbering-Machines, of which the following is a specification.

The present invention is an improvement in consecutive-numbering typographic machines, and its principal object, broadly stated, comprehends the production of an extremely simple and inexpensive machine of that type constructed in such a manner as to permit of its numbering not only forwardly, as is customary, but also backwardly, or in other words, from 1 upwardly, or from a high number downwardly, according as circumstances may require. This type of machine, as is generally understood, includes essentially, an operating plunger, a pawl swing, and a series of numbering wheels mounted on a fixed shaft and provided with drop ciphers. Ordinarily, the plunger and the swing are connected with the frame of the machine, and cannot be removed without unlocking the "form". Such defect is avoided in this invention by providing a removable and reversible plunger and either a similarly arranged or a double-acting swing adapted for coöperation therewith.

The invention also resides in the particular construction of the drop ciphers and the ratchets carried by certain of the numbering wheels, and of the shaft on which the latter are mounted, and in the provision of a rotatable spindle fitted in the bore of the shaft and operated at predetermined intervals to control the action of the ciphers.

The preferred embodiment of the invention is illustrated in the accompanying drawings, wherein:

Figures 1 and 2 are transverse sectional views of the improved machine, taken on the line x—x of Fig. 4 and showing the two positions of the pawl swing. Fig. 3 is an end elevation of the machine. Fig. 4 is a side elevation. Fig. 5 is a longitudinal section taken on the line z—z of Fig. 6, with the numbering wheels and swing omitted. Fig. 6 is a plan view. Figs. 7 to 11 are enlarged detail views of the numbering wheels in their proper order, the shaft and spindle being shown in section in Figs. 7 to 10, and the shaft alone in Fig. 11. Fig. 12 is an elevation of the double-acting swing, parts thereof being broken away. Figs. 13 and 14 are, respectively, a side elevation and a plan view of the shaft. Fig. 15 is a transverse section taken on the line 15—15 of Fig. 13. Fig. 16 is an end view of Figs. 13 and 14. Figs. 17 and 18 are, respectively, a side elevation and a plan view of the spindle. Fig. 19 is an end view of Figs. 17 and 18. Figs. 20, 21 and 22 are transverse sections taken on the correspondingly numbered lines of Fig. 17. Fig. 23 is a detail view of one of the numbering wheels, illustrating the ratchet and the drop cipher with which it is provided.

Reference being had to said drawings and to the characters marked thereon, A designates generally the plunger of the machine, B the pawl swing, F the fixed shaft upon which the numbering wheels 1, 2, 3, 4 and 5 are loosely mounted, and F' the rotatable spindle fitted in the bore of the shaft, the above mentioned elements being those of which the machine essentially consists and in the construction and arrangement of which the invention primarily resides.

The plunger A is similar in the main to that ordinarily employed in numbering machines, and is fitted in a compartment provided for it in the frame of the machine. It carries a lateral pin, the ends A' and A² of which project on opposite sides thereof, as shown in Fig. 6, and it is held normally in elevated position by means of the usual spring S, such movement being limited by a pair of screws A⁴ having mutilated heads. These heads in one position overhang the plunger, but they may be turned so as to bring their mutilated or cut away portions opposite the plunger, thereby permitting the removal and reversal of the latter, and its subsequent reinsertion in its compartment. The compartment in question is arranged at the left-hand end of the machine and is sufficiently wide to permit the insertion of a filling block A³ therein.

The swing B is of the usual shape and is provided, as is customary, with a series of spring pawls of graduated lengths. The end members C and C' of the swing are each provided at one side thereof with a lateral ear in which an elongated hole or perforation is formed, and said members C and C' are also formed with bosses which rest in arcuate collars D, D, provided upon the frame. The upper ends of these members are slotted to permit them to straddle the fixed shaft F and to be readily disengaged therefrom, reversed and reëngaged, so as to bring either member adjacent the plunger and to connect the plunger pin therewith.

When forward numbering is desired, the pin end A' is engaged in the perforation in the swing member C, as shown in Fig. 1, and when backward numbering is necessary, both the swing and the plunger are reversed and the pin end $A^2$ inserted in the perforation in the member C', (see Fig. 2).

The horizontal shaft F is formed with a series of peripheral collars 1', 2', 3', 4' and 5' (Figs. 5, 6, 13 and 14), and with an eccentric bore $f$ in which the spindle F' is rotatably fitted, as shown in Figs. 6 to 10, there being narrow circumferential spaces or grooves $k, k', k^2$ and $k^3$ between the adjacent collars. The bore $f$ above referred to opens through the upper surfaces of the collars 2', 3' and 4', and the outer end portion of said shaft, while the collar 5' is notched, (see Figs. 11 and 14). The numbering wheels 1, 2, 3, 4 and 5 are loosely mounted on the corresponding collars, and each of said wheels has rigidly secured to its right-hand face an annular ratchet H, the ratchets on the wheels 2, 3 and 4 being formed on their inner peripheral edges with pins $h, h'$ and $h^2$ which extend respectively into the grooves $k, k'$, and $k^2$.

The spindle F', as already stated, fits in the shaft bore $f$, and it comprises, essentially, a stem portion $f'$ and a head $f^2$, the latter fitting in the outer end portion of the bore, (see Fig. 6). The stem portion of the spindle is formed with a series of four transversely arranged peripheral shoulders $1^2, 2^2, 3^2$ and $4^2$ which are of gradually decreasing circumferential length and are spaced apart from each other, there being pins $i, i'$ and $i^2$ set into the spaces between the adjacent shoulders so as to be engaged respectively by the pins $h, h'$ and $h^2$. The pins $i$ and $i^2$ are arranged in the same plane, (longitudinal of the spindle), as shown in Fig. 19, while the pin $i'$ lies in a similar plane at right angles to the first-mentioned plane. The height of the shoulders above mentioned is equal to the thickness of the collars on shaft F.

The numbering wheels 2, 3 and 4 are provided, respectively, with drop ciphers M, M' and $M^2$, normally held in depressed position out of the printing line, by small springs N. These ciphers are each formed with a tail-piece $m$ which projects beyond the inner peripheral edge of the corresponding wheel. (See Fig. 23). Wheels 1 and 5 are of the ordinary construction. The head $f^2$ of the spindle has formed upon its periphery at equidistant points a series of four depressions $f^3$ successively engaged by the free end of a leaf spring G carried by a cap G' mounted upon the right hand end of the machine, as shown in Figs. 3, 4 and 5. The spring serves to yieldingly hold the spindle against rotation. When the swing B is reversed for backward numbering, the cap G' is likewise reversed, whereupon the spring assumes the position shown in dotted lines in Fig. 3.

The operation of the drop ciphers and spindle may be stated as follows, it being understood that for forward numbering the wheels are set in the ordinary manner and are actuated by the movements of the pawl swing which, in turn, is operated by the plunger A. The spindle is inserted in the bore of shaft F in the position shown in Figs. 17 and 18, that is to say, with the plain surface of its stem uppermost, so as to permit the tail-pieces of the three drop ciphers to project through the cut away portions of the collars 2', 3' and 4'. When the first movement is imparted to the second or tens wheel 2, its pin $h$ will contact with the pin $i$ carried by the spindle, and will turn the latter in the same direction, against the tension of spring G. This movement of the spindle, which is in effect a quarter revolution, will bring the shoulder $2^2$ into a position where it occupies the cut away portion of collar 2', the drop cipher M being raised during the movement of the wheel by the contact of its tail-piece with the edge of the above mentioned portion of said collar. The continued movement of this wheel will have no effect upon its cipher and the spindle, since the shaft bore $f$ is eccentric, and hence the pin $h$ will not again meet the pin $i$, the latter pin being shifted out of the path of movement of the first pin. When the third or hundreds wheel 3 is initially turned, the spindle will again be turned by the engagement of pin $h'$ with pin $i'$, and the cipher M' will be raised into the printing line. A similar result is likewise effected when the fourth or thousands wheel 4 is first operated, as will be apparent. Where reverse or backward rotation of the wheels is required, it is only necessary, after the pawl swing and plunger have been reversed, as above described, to turn the spindle one quarter of a revolution backward, whereupon the ciphers will sink in due order. In some cases, separate spindles for backward and forward numbering may be found more convenient.

As regards the double-acting swing shown in Fig. 12, it may be stated that no reversal of this swing is necessary, since its end members are formed at both sides with perforated lugs similar to the single lugs with which the members of the swing B are provided, the requisite change in its direction of movement being effected by the reversal of the plunger. The modified form of swing is also provided with a set of two-armed or double-acting pawls controlled by a spring, as shown. This swing supported in exactly the same manner as the single-acting swing.

What is claimed is:

1. In a numbering machine, the combination, with a pawl swing and a series of numbering wheels actuated thereby; of a reversible plunger for operating the swing.

2. In a numbering machine, the combination, of a series of numbering wheels; a reversible pawl swing for actuating the same; and a plunger for operating said swing.

3. In a numbering machine, the combination of a series of numbering wheels; a reversible pawl swing for actuating the same; and a reversible plunger for operating said swing.

4. In a numbering machine, the combination, with a series of numbering wheels; of a pawl swing for actuating said wheels provided with perforated end members; and a reversible plunger provided with means arranged for engagement in the perforation in the adjacent end member of said swing, for operating the latter.

5. In a numbering machine, the combination, with a series of numbering wheels; of a reversible pawl swing for actuating said wheels provided with perforated end members; and a reversible plunger provided with means arranged for engagement in the perforation in the adjacent end member of said swing, for operating the latter.

6. In a numbering machine, the combination, with a bored shaft, and a series of numbering wheels mounted thereon; of a spindle fitted within the bore of said shaft; and means carried by certain of said wheels for imparting a rotary movement to said spindle at predetermined intervals.

7. In a numbering machine, the combination, with a bored shaft, a series of numbering wheels mounted thereon, certain of said wheels having drop ciphers and means for normally retaining the ciphers in inoperative position; of mechanism for actuating the cipher-provided wheels, to move the ciphers into operative position; a spindle fitted in the bore of said shaft; means carried by said wheels for imparting a rotary movement to the spindle at predetermined intervals; and means carried by said spindle for preventing return movement of said ciphers into inoperative position.

8. In a numbering machine, the combination with an eccentrically bored shaft, and a series of numbering wheels mounted thereon; of a spindle fitted within the bore of said shaft; and means carried by certain of said wheels for imparting a rotary movement to said spindle at predetermined intervals.

9. In a numbering machine, the combination of a bored shaft; a numbering wheel rotatably mounted thereon and provided with a normally-depressed drop cipher; devices for rotating said wheel, to raise said cipher; a spindle fitted in the bore of the shaft; and means carried by said wheel and arranged to engage the spindle during the rotation of said wheel, to rotate said spindle into position to prevent the return downward movement of said cipher.

10. In a numbering machine, the combination of a shaft formed with a peripheral collar, and with a bore having a portion thereof opening through said collar; a numbering wheel rotatably mounted on said collar and provided with a normally-depressed drop cipher; a spindle fitted in said bore and provided with a peripheral shoulder; means for rotating said wheel to raise said cipher; and means carried by said wheel and arranged to engage and rotate the spindle when said wheel is rotated, to bring said shoulder into position to project into the opening in said collar, to prevent the return downward movement of said cipher.

11. In a numbering machine, the combination of a bored shaft; a numbering wheel rotatably mounted thereon and provided with a normally-depressed drop cipher; devices for rotating said wheel, to raise said cipher, said devices including a ratchet carried by said wheel; a spindle fitted in the bore of said shaft and provided with a pin; and a pin provided upon said ratchet and arranged to engage the first-mentioned pin when said wheel is rotated, to rotate said spindle into position to prevent the return downward movement of said cipher.

12. In a numbering machine, the combination of a shaft formed with a peripheral collar, and with a bore having a portion thereof opening through said collar; a numbering wheel rotatably mounted on said collar, and provided with a normally-depressed drop cipher; a spindle fitted in said bore and provided with a pin and with a peripheral shoulder; devices for rotating said wheel to raise said cipher, said devices including a ratchet carried by said wheel; and a pin provided upon said ratchet and arranged to engage the first-mentioned pin when said wheel is rotated, for rotating said spindle, to bring said shoulder into position to prevent the return downward movement of said cipher.

In testimony whereof I have hereunto set my hand in presence of two subscribing witnesses.

CHARLES BOWTELL SMITH.

Witnesses:
 HENTON MACAULAY DAVEY,
 R. M. JONES.